Figure 1:
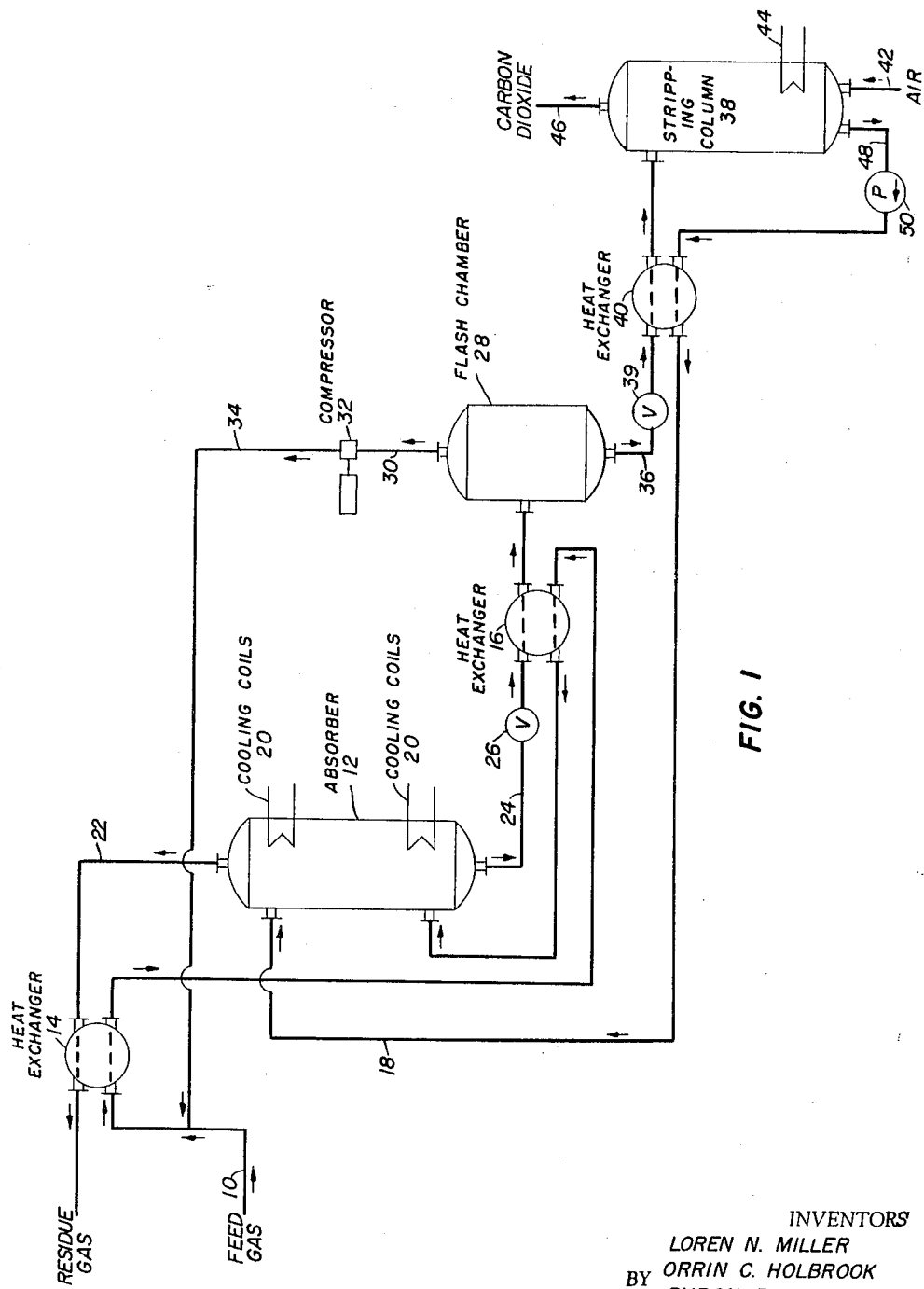

March 29, 1966 — L. N. MILLER ETAL — 3,242,646
PROCESS FOR REMOVING ACID CONSTITUENTS FROM GASEOUS MIXTURES
Filed Dec. 27, 1962 — 2 Sheets-Sheet 1

INVENTORS
LOREN N. MILLER
ORRIN C. HOLBROOK
BYRON B. WOERTZ
BY
ATTORNEY

INVENTORS
LOREN N. MILLER
ORRIN C. HOLBROOK
BYRON B. WOERTZ
BY
ATTORNEY

United States Patent Office

3,242,646
Patented Mar. 29, 1966

3,242,646
PROCESS FOR REMOVING ACID CONSTITUENTS
FROM GASEOUS MIXTURES
Loren N. Miller, Arvada, Colo., Orrin C. Holbrook, Andrews, Tex., and Byron B. Woertz, Crystal Lake, Ill., assignors, by mesne assignments, to Union Oil Company of California, Los Angeles, Calif., a corporation of California
Filed Dec. 27, 1962, Ser. No. 247,719
10 Claims. (Cl. 55—48)

This invention relates to a selective solvent for removing acid gases from admixtures with non-acidic constituents and, more particularly, to an improved process for the removal of carbon dioxide from a gaseous mixture of hydrocarbons and/or other non-acidic constituents containing carbon dioxide by the use of a selective solvent consisting essentially of at least one alkyl cyanohydrin. This invention is especially useful for removing carbon dioxide from natural gases containing significant amounts of ethane and heavier hydrocarbons.

The acid gas content of natural gases varies between broad limits, depending on the field from which the natural gas was produced. Natural gases produced from some subterranean reservoirs contain undesirably high concentrations of acid gases, such as carbon dioxide and hydrogen sulfide. Before these natural gases can be sold, it is necessary that the high concentration of acid gases be removed or at least reduced to an acceptable concentration. Various methods of removing acid gases from natural gas have been proposed. The removal of hydrogen sulfide has been accomplished by several acceptable commercial methods, but the removal of carbon dioxide remains a problem in the art.

Since carbon dioxide is chemically reactive while the hydrocarbon gases are relatively inert, one approach taken in attempting to solve the problem of removing carbon dioxide from mixtures containing the same is the use of solvents which react with carbon dioxide to remove it in chemically combined form. For example, hot potassium carbonate and mono- or diethanolamine have been proposed for removing carbon dioxide from natural gas. However, in order for any separation process to be practical, it must be possible to regenerate and recycle the solvent. It is apparent that regeneration of the chemically reactive solvents is expensive, and processes based on them are especially expensive when high concentrations of carbon dioxide are involved.

It has also been proposed to remove carbon dioxide from gaseous mixtures by the utilization of solvents which have a selective solubility for carbon dioxide. Selective solvents currently used commercially in carbon dioxide removal processes are water, methyl alcohol, acetone and propylene carbonate. The selectivity of water for carbon dioxide is excellent, but is capacity is very low, thereby requiring high circulation rates and large tower sizes in the water-wash process. At ambient temperature, the capacity of methyl alcohol is high but its selectivity is very poor. Propylene carbonate extraction is the most economical present method of removing large concentrations of carbon dioxide from methane since its capacity for carbon dioxide is high and its selectivity for extracting carbon dioxide from methane is excellent. However, its selectivity decreases rapidly as the molecular weights of the hydrocarbons in the gaseous mixture increase. In removing carbon dioxide from rich gases, the propylene carbonate process would result in prohibitive loss of ethane and heavier hydrocarbons. Inasmuch as the propylene carbonate process is suitable for use in only very "lean" gas, i.e., gas having a low content of ethane and higher-molecular-weight hydrocarbons, its usefulness is restricted to the removal of carbon dioxide from natural gases produced from only a small percentage of existing fields.

In accordance with this invention, we have found that a selective solvent consisting essentially of at least one alkyl cyanohydrin of the formula, HO·R·CN, wherein R is a lower straight or branched chain alkyl radical, preferably containing two or three carbon atoms, is an effective solvent for removing carbon dioxide from gaseous mixtures containing hydrocarbons and/or other non-acidic constituents. Preferred compounds coming within the foregoing formula are those where R is a lower straight chain radical, such as ethylene cyanohydrin (hydracrylonitrile) and trimethylene cyanohydrin $$(HO—(CH_2)_3—CN)$$

An example of a compound wherein R is a branched chain radical is acetone cyanohydrin. The selective solvents of this invention are also generally effective for removing hydrogen sulfide from gaseous mixtures. The alkyl cyanohydrin-containing solvent may be utilized in combination with a second higher boiling, hygroscopic solvent, such as a glycol, to remove additional moisture from the gaseous mixture, as well as to recover the alkyl cyanohydrins which would otherwise be lost in the process.

Figure 2:
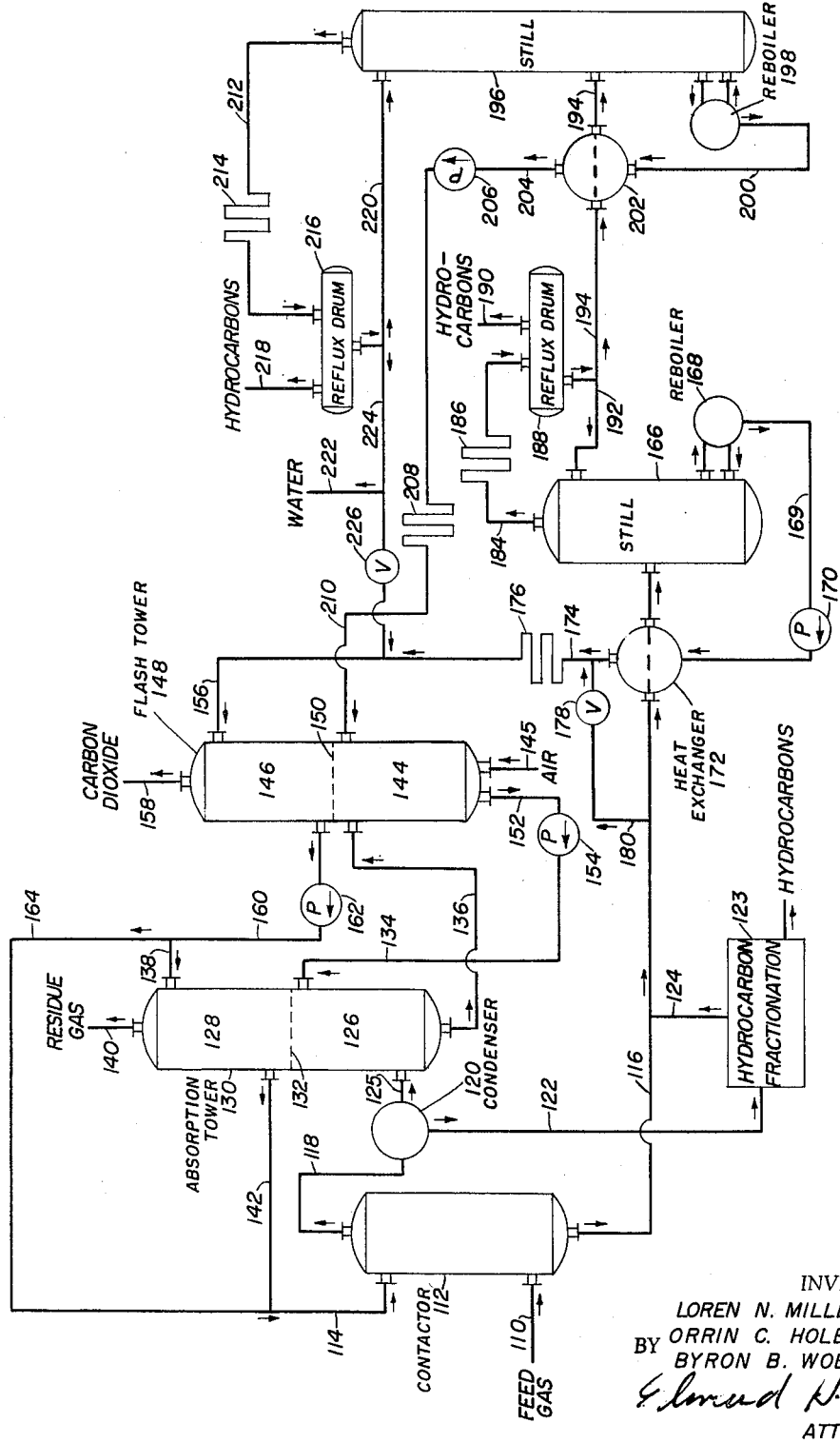

It is therefore, a primary object of this invention to provide a process for removing acid gases from gaseous mixtures containing same. Another object of this invention is to provide a process for removing carbon dioxide from a hydrocarbon gas mixture containing same. Still another object of this invention is to provide a process for removing carbon dioxide from natural gas containing significant amounts of ethane and higher-molecular-weight hydrocarbons. A further object of this invention is to provide a process for the removal of carbon dioxide from gaseous mixtures utilizing a superior selective solvent comprising an alkyl cyanohydrin. A still further object of this invention is to provide a process for removing carbon dioxide and moisture from gaseous mixtures utilizing a combination of an alkyl cyanohydrin-containing solvent and a second, higher boiling, hygroscopic solvent, the second solvent also serving to recover the alkyl cyanohydrin which would otherwise be lost in the process. These and further objects of this invention will become apparent and be described as the description herein proceeds and reference is made to the accompanying drawings in which:

FIGURE 1 is a diagrammatic illustration of an absorption-desorption system for carrying out the process of this invention; and FIGURE 2 is a diagrammatic illustration of an alternative embodiment of an absorption-desorption system for carrying out the process of this invention utilizing a combination of solvents, one being an alkyl cyanohydrin-containing solvent and the other a higher boiling, hygroscopic solvent.

The properties of hydracrylonitrile which make it an attractive selective solvent for carbon dioxide are its relatively high selectivity for extracting carbon dioxide from gaseous mixtures containing ethane and higher-molecular-weight gaseous hydrocarbons, its relatively high boiling point (442° F.), relatively low freezing point (—51° F.), and low cost. Hydracrylonitrile, by being completely water miscible, will essentially dehydrate the gas being treated if water content of the hydracrylonitrile is kept very low, e.g., less than 5 vol. percent, depending upon contacting conditions.

The alkyl cyanohydrin solvents of this invention may be used in the pure form for absorbing carbon dioxide and in admixture with other solvents. For example a major portion of at least one alkyl cyanohydrin may be used in admixture with a minor portion of an inert solvent to modify one of its properties, such as to reduce its viscosity at very low temperatures, or increase its capacity for carbon dioxide. The inert solvent is defined as one which is unreactive toward the alkyl cyanohydrin and other solvent constituents, and the acidic constituents of the gas. On the other hand, a minor portion of at least one alkyl cyanohydrin may be added to a major portion of another solvent which selectively adsorbs carbon dioxide to increase the selectivity of the other solvent for carbon dioxide. Examples of solvents for $CO_2$ with which the alkyl cyanohydrins may be used in admixture include propylene carbonate, ethylene carbonate, γ-butyrolactone, formamide, N,N-dimethylformamide, methyl acetoacetate, methyl cyanoacetate, and nitromethane. Ethylene carbonate, having a melting point of about 95° F., is herein considered a liquid since most mixtures of it with the other solvents, are normally liquid at ambient temperature.

The suitability of the alkyl cyanohydrins as a selective solvent for carbon dioxide has been demonstrated experimentally in a series of tests wherein the capacity of a number of solvents for carbon dioxide and propane, and the selectivity for carbon dioxide relative to ethane and propane, were determined. Solubilities were measured by injecting a measured volume of solvent into an evacuated Dumas bulb, measuring the vapor pressure of the solvent, and then metering in sufficient carbon dioxide to bring the bulb to atmospheric pressure. A series of calculations provided a corrected solubility of carbon dioxide at 80° F. The propane solubilities were similarly measured. The ratio of the carbon dioxide solubility to the propane solubility was termed the selectivity ratio. Since scattered tests using various solvents indicated that ethane solubilities are a direct function of the propane solubilities, the ratio of carbon dioxide solubility to the propane solubility was used to calculate the ethane selectivity. The results of this comparison are shown in Table I.

ral gas containing carbon dioxide, the process of this invention is applicable to the treatment of any carbon dioxide-containing gaseous mixture as long as the solvent has a selectivity for extracting carbon dioxide from the gaseous mixture. For example, the solvent of this invention can be used for removing carbon dioxide from flue gas, or hydrogen, or reformed gas for ammonia synthesis.

The process of this invention is carried out using conventional absorption procedures, wherein the gaseous mixture is contacted with the selective solvent of this invention in either batchwise or countercurrent treatment. Successive batchwise extractions also can be used. In the preferred method of practicing the invention, the gaseous mixture to be treated is contacted in a countercurrent absorption tower with the alkyl cyanohydrin-containing solvent in a continuous flow method. The spent solvent is continuously withdrawn from the absorption tower, and is introduced into a flash chamber and/or air-stripping column to remove the absorbed gases. The regenerated solvent is then recycled through the absorption tower where it is used again.

The extraction process is preferably carried out at temperatures within the range of about −50° to 100° F., although higher and lower temperatures may be utilized. It will be evident that the minimum temperature at which any specific solvent can be used is the minimum temperature at which the composition is a liquid, or the hydrate temperature of the gas, whichever is higher. Pressure from about 100 to 1000 p.s.i.g. (pounds per square inch gauge) may be used. The vaporization loss of the solvent is a factor to be considered in determining the contacting conditions. For example, the vaporization loss of hydracrylonitrile in the residue gas will be limited to about 0.1 gal./MMCF residue gas if a maximum contact temperature of 87° F. is used in an absorption tower operating at 600 p.s.i.g. In general, the feed gas and solvent are contacted at a rate of 5 to 150 gallons of solvent per MCF of gas.

TABLE I

|  | Solvent Capacity [1] | | Selectivity Ratio | |
| --- | --- | --- | --- | --- |
|  | $CO_2$ | $C_3H_8$ | $CO_2/C_3H_8$ | $CO_2/C_2H_6$ |
| Hydracrylonitrile | 2.30 | 0.44 | 5.30 | 15.9 |
| Trimethylene cyanohydrin | 3.30 | 1.98 | 1.67 | 5.0 |
| Acetone cyanohydrin | 2.98 | 1.95 | 1.53 | 4.6 |
| Acetonitrile | 6.65 | 5.17 | 1.28 | 4.0 |
| Methyl alcohol | 3.50 | 5.80 | 0.60 | 1.8 |
| Propylene carbonate | 3.40 | 2.20 | 1.50 | 4.5 |
| Absorber oil | 0.90 | 9.00 | 0.10 | 0.5 |

[1] Solubilities determined here are volumes of gas dissolved, measured at 1 atmosphere and 80° F., per volume of solvent, measured at 80° F., when the partial pressure of dry gas above the solvent is one atmosphere.

This comparison shows that hydracrylonitrile, our preferred solvent, possesses a carbon dioxide selectivity in the presence of ethane and propane about four times higher than that of acetonitrile, as representative of other nitriles. It can also be seen that while the capacity of hydracrylonitrile for carbon dioxide is only about one-third less than the capacity of propylene carbonate, the selectivity of hydracrylonitrile for extracting carbon dioxide from ethane and propane is over three and one-half times greater than that of propylene carbonate. This superior selectivity more than offsets the lower capacity for carbon dioxide. It can also be seen that the selectivities of trimethylene cyanohydrin and acetone cyanohydrin are slightly better than the selectivity of propylene carbonate. The superiority of the solvents of this invention will be apparent from the selectivity ratios given in the above table.

In general, this invention contemplates the removal of carbon dioxide from gaseous mixtures containing same by treatment with a selective solvent comprising a lower alkyl cyanohydrin. In addition to the treatment of natu- This invention is best understood by reference to FIGURE 1, wherein a feed gaseous mixture such as natural gas, containing carbon dioxide which is to be removed therefrom, is fed through line 10 into the bottom of absorber 12 after it passes in indirect heat exchange with the residue gas from absorber 12 in heat exchanger 14 and rich absorbent in heat exchanger 16. The alkyl cyanohydrin absorbent, such as pure hydracrylonitrile or hydracrylonitrile-containing absorbent mixture, both of which are hereinafter referred to merely as the hydracrylonitrile absorbent, is introduced into the top of absorber 12 through line 18. Absorber 12 can be any suitable absorption column, such as a vertically extended column, containing appropriate packing or trays to assure intimate countercurrent contact of the rising feed mixture with the down-flowing absorbent, and cooling coils 20 to provide the desired degree of cooling, as illustrated in the drawing. Absorber 12 is maintained under such conditions of pressure, usually superatmospheric, and temperature that carbon dioxide is absorbed from the feed mixture. As previously indicated, the absorption process is preferably carried out at a temperature within the range of about −50° F. to 100° F. and a gas inlet pressure between 100 to 1000 p.s.i.g. The amount and rate of carbon dioxide absorption increase directly with an increase in the pressure maintained in the absorption zone. The feed mixture, from which at least part of the carbon dioxide content has been absorbed, is then removed from absorber 12 through line 22, passed in indirect heat exchange with the feed gas in exchanger 14, and fed to a suitable receiver or otherwise disposed of.

The spent hydracrylonitrile absorbent, containing absorbed carbon dioxide, is withdrawn from absorber 12 through line 24. Then, the rich absorbent undergoes a controlled pressure reduction, such as by-passing it successively through expansion valve 26, heat exchanger 16 and flash chamber 28. Flash chamber 28 is maintained at a pressure below the pressure of absorption column 12, but above atmospheric pressure, e.g., about 50 to 200 p.s.i.g. As the absorbent undergoes a pressure reduction, it is cooled due to the loss of heat of absorption acquired in absorber 12 and expansion of absorbed carbon dioxide to a lower partial pressure. Part of the absorbed carbon dioxide and non-acidic constituents of the feed gas are withdrawn from flash chamber 28 through line 30. The gases in line 30 are compressed in compressor 32, and passed through line 34 to be mixed with the feed gas before it passes through exchanger 14. The partially desorbed absorbent is withdrawn from flash chamber 28 through line 36 and fed into stripping column 38 after it has passed through expansion valve 39 and exchanger 40 in indirect heat exchange with the lean absorbent withdrawn from column 38.

Air or other inert stripping gas is introduced into stripping column 38 through line 42. Stripping column 38 is provided with heating coil 44 to apply heat if necessary. In stripping column 38, substantially all of the remaining absorbed carbon dioxide is removed and withdrawn through line 46 to be disposed of as desired. Line 46 may be provided with a vacuum pump, if desired. The resulting lean absorbent is then withdrawn from stripping column 38 through line 48, where it is forced by pump 50 through heat exchanger 40 and then returned to absorber 12 through line 18. It will be evident that line 18 may include a second heat exchanger, not shown, to cool the lean absorbent further after it has passed through heat exchanger 40.

Other alternative absorption-desorption processes will be apparent to those skilled in the art. For example, if it is not desired to limit the loss of the non-acidic constituents of the feed gas, the rich absorbent may be desorbed in a flash or stripping step and the off-gases disposed of as desired. The partially desorbed absorbent may then be recycled to the absorber or introduced into a stripping column to remove the last vestages of absorbed carbon dioxide before it is recycled to the absorption column. The residue gas from the absorber and/or the flash gas may be passed through a solid bed of an absorbent, such as silica gel, activated alumina, activated carbon or a synthetic zeolite to separate vaporized absorbent therefrom.

In another alternative embodiment of this invention, the hydracrylonitrile absorbent may be used in combination with a second, higher-boiling, hygroscopic solvent which is absorptive of the hydracrylonitrile absorbent. The second absorbent serves to remove additional moisture from the feed gaseous mixture, as well as to recover hydracrylonitrile which would otherwise be lost in the product gas stream. The hygroscopic solvent may, for example, be any of the polyhydric alcohols or glycols which have been proposed or used for moisture extraction, such as ethylene glycol, propylene glycol, diethylene glycol, and triethylene glycol.

In accordance with this embodiment, the hydracrylonitrile absorbent may be used without uneconomically high solvent losses, which are common in conventional processes. The hydracrylonitrile absorbent is used for the removal of carbon dioxide from the feed gas stream, and the hygroscopic solvent is used for the recovery of hydracrylonitrile absorbent from the effluent product gas and carbon dioxide streams, and for the removal of additional water from the feed gas stream.

This alternative embodiment is best understood by reference to FIGURE 2 wherein the numeral 110 represents the line through which the gas to be treated, for example, a natural gas consisting of hydrocarbons, carbon dioxide, and moisture, is fed into the bottom of contactor 112, in which it is countercurrently contacted with a mixture of the hydracrylonitrile and hygroscopic solvent entering through line 114. Contactor 112, which may contain any suitable type and arrangement of trays or baffles as required for intimacy of contact between the absorbent mixture and feed gas, is preferably maintained at a temperature within the range of about 0° to 100° F. and pressure within the range of about 100 to 1000 p.s.i.g., although higher and lower temperatures and pressures may be used. A suitable example of the absorbent mixture entering contactor 112 through line 114 is 75 to 95% by weight of a glycol, such as diethylene or triethylene glycol, 0 to 20% by weight of hydracrylonitrile and 0 to 20% by weight of water, the amount of the water being indirectly proportional to the contacting temperature in order to reduce the glycol viscosity. For low temperature operation, as at about −50° F. to 100° F., for example, a small amount of water is required in the glycol to maintain a satisfactory viscosity; the glycol containing a minor amount of water will still dehydrate the feed gas satisfactorily. In contactor 112, much of the water content of the feed gas stream is taken up by the glycol solvent. Glycol absorbent, containing water and some hydracrylonitrile absorbent, is withdrawn from contactor 112 through line 116. The resulting natural gas-hydracrylonitrile absorbent mixture leaves contactor 112 through line 118, and flows to chiller-condenser 120, in which its temperature is reduced to absorption temperature, for example, −50° to 100° F. The condensate is withdrawn from chiller-condenser 120 through line 122 and may be combined with the liquid in line 116. The condensate in line 122 is preferably first introduced into fractionating unit 123 to separate condensed hydrocarbons before it is combined with the liquid in line 116 by way of line 124.

The chilled, uncondensed components of the natural gas-hydracrylonitrile absorbent mixture pass from chiller-condenser 120 through line 125 to the absorbing zone which, as illustrated, may be contained within the lower and upper sections 126 and 128 of a single vertically extended absorption tower 130, the two sections being separated by liquid trap-out tray 132. Absorber 130 can have any suitable arrangement of packing or trays to assure intimate counter-current contact of the rising feed mixture with the down-flowing absorbent. In section 126, the gas is counter-currently contacted with hydracrylonitrile absorbent entering through line 134, which removes at least part of the acid gas constituents. Rich hydracrylonitrile absorbent, containing absorbed carbon dioxide, is withdrawn from absorption tower 130 through line 136. The scrubbed gas passes on upward in tower 130 past trap-out tray 132 into upper section 128, where it is countercurrently contacted with the glycol absorbent entering through line 138. The glycol absorbent scrubs any vaporized hydracrylonitrile absorbent from the natural gas, and the scrubbed natural gas product, of reduced carbon dioxide content, is withdrawn through line 140 to a suitable receiver or other disposition. The mixture of glycol and hydracrylonitrile absorbents from upper section 128 is trapped on tray 132, and is withdrawn through line 142 and introduced into contactor 112 through line 114.

The hydracrylontrile absorbent in line 136 enters a combined flashing and contacting zone which, as illustrated, may be lower flashing zone 144 and upper contacting zone 146 in a single vertically extended vessel 148, with the upper and lower sections being separated by liquid trap-out tray 150. The rich hydracrylonitrile absorbent enters flash and stripping zone 144, which is maintained at a pressure below the absorption column pressure, and usually at about atmospheric pressure, where it undergoes pressure reduction to flash-off absorbed carbon dioxide. Zone 144 is provided with suitable contacting devices such as trays or packing. An inert stripping gas, such as air, man be introduced into zone 144 through line 145. The lean hydracrylonitrile absorbent is withdrawn from flash zone 144 through line 152 and is introduced back to absorption tower 130 by pump 154 through line 134. Carbon dioxide containing entrained or vaporized hydracrylonitrile absorbent leaves flash zone 144, and passes through trap-out tray 150 into contacting zone 146 where it is countercurrently contacted with glycol solvent entering through line 156. The glycol solvent scrubs any vaporized hydracrylonitrile absorbent from the carbon dioxide, and the carbon dioxide and stripping gas are withdrawn through line 158 to be disposed of as desired.

The resulting mixture of the glycol and hydrocrylonitrile absorbents from contacting zone 146 of vessel 148 is trapped on tray 150 and withdrawn through line 160. Part of the solvent mixture in line 160 is passed by pump 162 to branch line 138 from where it is introduced into upper section 128 of contactor 130. The remainder of the solvent in line 160 is passed through line 164 and combined with the solvent mixture in line 142 to form the mixture entering contactor 112 through line 114.

The glycol absorbent, containing water and some hydracrylonitrile absorbent, which was withdrawn from contactor 112 through line 16, is fed into glycol still 166, equipped with reboiler 168. Regenerated glycol, substantially free of hydracrylonitrile absorbent and water, is removed from reboiler 168 through line 169 and forced by pump 170 through heat exchanger 172, where it passes in indirect heat exchange with the mixture in line 116. From heat exchanger 172, the regenerated glycol passes through line 174, cooler 176 and line 156 to contacting zone 146 of vessel 148. If desired, part of the mixture in line 116 may be made to by-pass still 166 by opening valve 178 so that it passes through line 180 into line 174. Water and hydracrylonitrile absorbent are withdrawn as overhead from still 166 through line 184, and are passed through overhead condenser 186 and into reflux drum 188. Non-condensable hydrocarbon gases are vented from reflux drum 188 by line 190. From reflux drum 188, part of the liquid is returned through line 192 to still 166, while the balance is passed through line 194 to still 196.

Still 196 is provided with reboiler 198 from which regenerated hydracrylonitrile absorbent is withdrawn through line 200 and passed in heat exchange with liquid in line 194 in heat exchanger 202. The hydracrylonitrile is then withdrawn from heat exchanger 202 through line 204 and forced by pump 206 through cooler 208 and line 210 into flash zone 144 of vessel 148. The overhead from still 196, consisting mainly of water, is withdrawn through line 212 and passed through condenser 214 into reflux drum 216, from which hydrocarbons are withdrawn through line 218. Part of the water in reflux drum 216 is returned through line 220 to still 196, and the remaining portion is discarded through line 222 or fed through line 224 into line 156 by opening valve 226.

The following specific examples will serve to more particularly point out the instant invention:

Example I

A gaseous mixture containing 19% carbon dioxide and 81% methane was brought into equilibrium with hydracrylonitrile at 0° F. and 614.2 p.s.i.a. When analyzed, the resulting solution was found to contain 12.8 mol percent of carbon dioxide, 1.05 mol percent of methane, and the balance hydracrylonitrile. This indicates a solubility under these conditions of 7.0 s.c.f./gallon of carbon dioxide and 0.55 s.c.f./gallon of methane. When the experiment is repeated using pure propylene carbonate as the solvent, the propylene carbonate is found to contain a greater amount of carbon dioxide than the hydracrylonitrile, but also about three times the amount of the dissolved methane.

Example II

Tables II and III are illustrative of the process streams of the process depicted in FIGURE 1 wherein a natural gas mixture is contacted in absorber 12, maintained at 600 p.s.i.a. and 0° F. and containing ten theoretical trays, with the lean absorbent. One hundred pound mols of the natural gas per unit time are contacted in different runs with (1) 50 vol. percent of hydracrylonitrile and 50 vol. percent of nitromethane and (2) propylene carbonate in such amounts that the residue gas contains 2 vol. percent of carbon dioxide. The rich absorbent withdrawn from absorber 12 is flashed at 150 p.s.i.a. and 0° F. in flash chamber 28 and the pressure of the partially desorbed absorbent withdrawn from flash chamber 28 is reduced to atmospheric pressure in stripping column 38. Table II gives the compositions of the process streams where the gas is contacted with the blend and, for the purpose of comparison, Table III gives the composition of the process streams wherein the gas is contacted with the propylene carbonate.

The required solvent circulation is 23.2 gallons of the hydracrylonitrile-nitromethane blend per MCF of inlet gas to reduce the carbon dioxide content of the residue gas to 2.0 vol. percent, as compared to 26.2 gal./MCF when using propylene carbonate (gas and solvent volumes measured at 14.7 p.s.i.a. and 60° F.). As shown in the following tables, the recycle gas (line 30) is increased from 5.00 to 5.30 mols and the residue gas (line 22) is increased to 81.08% from 80.10% of the inlet gas by the use of our solvent blend, as compared to proplyene carbonate.

TABLE II $CO_2$ absorption process using 50 vol. percent hydracrylonitrile and 50 vol. percent of nitromethane

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | |
|---|---|---|---|---|---|---|---|---|---|
| | | | Mols | Mol Percent | | Mols | Mol Percent | Mols | Mol Percent |
| Methane | 72.00 | | 71.59 | 88.29 | 2.11 | 1.70 | 32.1 | 0.41 | 2.2 |
| Ethane | 6.00 | | 5.68 | 7.01 | 0.68 | 0.36 | 6.8 | 0.32 | 1.7 |
| Propane | 2.00 | | 1.63 | 2.01 | 0.55 | 0.18 | 3.4 | 0.37 | 2.0 |
| $CO_2$ | 19.00 | | 1.62 | 2.00 | 20.34 | 2.96 | 55.8 | 17.38 | 91.8 |
| n-Butane | 1.00 | 123.02 | 0.56 | 0.69 | 0.54 | 0.10 | 1.9 | 0.44 | 2.3 |
| Absorbent | 0 | | 0 | 0 | 123.02 | 0 | 0 | 0 | 0 |
| Total | 100.00 | 123.02 | 81.08 | 100.00 | 147.24 | 5.30 | 100.00 | 18.92 | 100.00 |

TABLE III

$CO_2$ absorption process using propylene carbonate
Solvent circulation rate=26.2 gal./MCF inlet gas

| Components | Mols of Inlet Gas (Line 10) | Mols of Solvent (Line 18) | Residue Gas (Line 22) Mols | Residue Gas (Line 22) Mol Percent | Mols of Rich Solvent (Line 24) | 150 p.s.i.a. Flash Gas (Line 30) Mols | 150 p.s.i.a. Flash Gas (Line 30) Mol Percent | Atmos. Strip Gas (Line 46) Mols | Atmos. Strip Gas (Line 46) Mol Percent |
|---|---|---|---|---|---|---|---|---|---|
| Methane | 72.0 | | 71.56 | 89.34 | 2.53 | 2.09 | 41.8 | 0.44 | 2.21 |
| Ethane | 6.0 | | 5.46 | 6.81 | 0.99 | 0.45 | 9.0 | 0.54 | 2.71 |
| Propane | 2.0 | | 1.33 | 1.66 | 0.87 | 0.20 | 4.0 | 0.67 | 3.37 |
| $CO_2$ | 19.0 | | 1.60 | 2.00 | 19.56 | 2.16 | 43.2 | 17.40 | 87.44 |
| n-Butane | 1.0 | | 0.15 | 0.19 | 0.95 | 0.10 | 2.0 | 0.85 | 4.27 |
| Propyl. carbon | 0 | 98.43 | 0 | 0 | 98.43 | 0 | 0 | 0 | 0 |
| Total | 100.0 | 98.43 | 80.10 | 100.00 | 123.33 | 5.00 | 100.0 | 19.90 | 100.00 |

EXAMPLE III

Tables IV to VIII are also illustrative of the process streams of the process described in relation to FIGURE 1, wherein the natural gas mixture of Example II is contacted in absorber 12, containing ten theoretical trays and maintained at 600 p.s.i.a. and 0° F. (except in Table IV where it is maintained at 70° F.), with various solvents of this invention. The rich absorbent withdrawn from absorber 12 is flashed at the indicated conditions in flash chamber 28 and the solvent rate is adjusted as indicated to yield about 2.0 vol. percent carbon dioxide in the residue gas.

TABLE IV

Solvent: Hydracrylonitrile
Rich solvent flashed at 0° F. and 150 p.s.i.a.
Solvent circulation rate of 34.3 gal./MCF

| Component | Mols of Inlet Gas (Line 10) | Residue Gas (Line 22) Mols | Residue Gas (Line 22) Mol Percent | Mols of Rich Solvent (Line 24) | Mols of Flash Gas (Line 30) | Mols of Atmos. Strip Gas (Line 46) | Percent Loss |
|---|---|---|---|---|---|---|---|
| Methane | 72.0 | 71.63 | 88.38 | 1.53 | 1.16 | 0.37 | 0.51 |
| Ethane | 6.0 | 5.62 | 6.93 | 0.60 | 0.22 | 0.38 | 6.3 |
| Propane | 2.0 | 1.62 | 2.00 | 0.46 | 0.08 | 0.38 | 19.0 |
| $CO_2$ | 19.0 | 1.61 | 1.99 | 18.31 | 0.92 | 17.39 | 91.5 |
| n-Butane | 1.0 | 0.57 | 0.70 | 0.48 | 0.04 | 0.43 | 43.0 |
| Absorbent | 0 | 0 | 0 | 161.32 | 0 | 0 | |
| Total | 100.00 | 81.05 | 100.00 | 182.70 | 2.42 | 18.95 | |

TABLE V

Solvent: Trimethylene cyanohydrin
Rich solvent flashed at 0° F. and 150 p.s.i.a.
Solvent circulation rate of 26.0 Gal./MCF

| Component | Mols of Inlet Gas (Line 10) | Residue Gas (Line 22) Mols | Residue Gas (Line 22) Mol Percent | Mols of Rich Solvent (Line 24) | Mols of Flash Gas (Line 30) | Mols of Atmos. Strip Gas (Line 46) | Percent Loss |
|---|---|---|---|---|---|---|---|
| Methane | 72.0 | 71.83 | 89.11 | 2.77 | 2.61 | 0.17 | 0.24 |
| Ethane | 6.0 | 5.68 | 7.04 | 1.12 | 0.80 | 0.32 | 5.3 |
| Propane | 2.0 | 1.40 | 1.74 | 1.04 | 0.44 | 0.60 | 30.0 |
| $CO_2$ | 19.0 | 1.59 | 1.97 | 24.17 | 6.77 | 17.40 | 91.6 |
| n-Butane | 1.0 | 0.11 | 0.14 | 1.11 | 0.22 | 0.89 | 89.0 |
| Absorbent | 0 | 0 | 0 | 107.14 | 0 | 0 | |
| Total | 100.00 | 80.61 | 100.00 | 137.35 | 10.84 | 19.38 | |

TABLE VI

Solvent: Trimethylene cyanohydrin
Rich solvent flashed at 70° F. and 200 p.s.i.a.
Solvent circulation rate of 64.6 Gal./MCF

| Component | Mols of Inlet Gas (Line 10) | Residue Gas (Line 22) Mols | Residue Gas (Line 22) Mol Percent | Mols of Rich Solvent (Line 24) | Mols of Flash Gas (Line 30) | Mols of Atmos. Strip Gas (Line 46) | Percent Loss |
|---|---|---|---|---|---|---|---|
| Methane | 72.0 | 70.66 | 89.91 | 4.23 | 2.89 | 1.34 | 1.9 |
| Ethane | 6.0 | 5.25 | 6.68 | 1.31 | 0.56 | 0.75 | 12.5 |
| Propane | 2.0 | 1.10 | 1.40 | 1.17 | 0.28 | 0.90 | 45.0 |
| $CO_2$ | 19.0 | 1.57 | 2.00 | 20.34 | 2.91 | 17.43 | 91.7 |
| n-Butane | 1.0 | 0.01 | 0.01 | 1.09 | 0.11 | 0.99 | 99.0 |
| Absorbent | 0 | 0 | 0 | 266.40 | 0 | 0 | |
| Total | 100.00 | 78.59 | 100.00 | 294.54 | 6.75 | 21.41 | |

TABLE VII

Solvent: 75 vol. percent methyl acetoacetate and 25 vol. percent hydracrylonitrile
Rich solvent flashed at 0° F. and 200 p.s.i.a.
Solvent circulation rate of 17.3 Gal./MCF

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent Loss |
|---|---|---|---|---|---|---|---|
| | | Mols | Mol Percent | | | | |
| Methane | 72.0 | 71.58 | 89.62 | 3.02 | 2.60 | 0.42 | 0.58 |
| Ethane | 6.0 | 5.43 | 6.80 | 1.22 | 0.65 | 0.57 | 9.5 |
| Propane | 2.0 | 1.21 | 1.52 | 1.09 | 0.30 | 0.79 | 39.5 |
| $CO_2$ | 19.0 | 1.60 | 2.00 | 20.46 | 3.06 | 17.40 | 91.6 |
| n-Butane | 1.0 | 0.05 | 0.06 | 1.08 | 0.13 | 0.95 | 95.0 |
| Absorbent | 0 | 0 | 0 | 58.48 | 0 | 0 | |
| Total | 100.00 | 79.87 | 100.00 | 85.35 | 6.74 | 20.13 | |

TABLE VIII

Solvent: 50 vol. percent methyl acetoacetate and 50 vol. percent hydracrylonitrile
Rich solvent flashed at 0° F. and 150 p.s.i.a.
Solvent circulation rate of 36.4 Gal./MCF

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent Loss |
|---|---|---|---|---|---|---|---|
| | | Mols | Mol Percent | | | | |
| Methane | 72.0 | 71.67 | 88.97 | 2.69 | 2.36 | 0.33 | 0.46 |
| Ethane | 6.0 | 5.58 | 6.93 | 0.97 | 0.56 | 0.42 | 7.0 |
| Propane | 2.0 | 1.45 | 1.80 | 0.81 | 0.26 | 0.55 | 27.5 |
| $CO_2$ | 19.0 | 1.61 | 2.00 | 20.63 | 3.25 | 17.38 | 91.5 |
| n-Butane | 1.0 | 0.24 | 0.30 | 0.89 | 0.13 | 0.76 | 76.0 |
| Absorbent | 0 | 0 | 0 | 139.22 | 0 | 0 | |
| Total | 100.00 | 80.55 | 100.00 | 165.21 | 6.56 | 19.44 | |

The embodiments of the invention in which an exclusive property or privilege is claimed are defined as follows:

1. The process of removing gaseous acid gas selected from the group consisting of carbon dioxide and hydrogen sulfide from admixture with gaseous $C_1$—$C_3$ alkane hydrocarbons which comprises contacting said gaseous admixture with an acid gas absorbent consisting essentially of a solvent selected from the group consisting of hydroacrylonitrile and a mixture of hydroacrylonitrile with a liquid inert to the solvent and gas admixture constituents, under conditions resulting in selective absorption of said acid gas, and separating the unabsorbed components of said gaseous admixture from said solvent.

2. The process according to claim 1 in which said acid gas is carbon dioxide.

3. The process according to claim 2 in which said solvent consists essentially of hydroacrylonitrile and a liquid selected from the group consisting of propylene carbonate, ethylene carbonate, γ-butrolactone, methyl acetoacetate, and N,N-dimethylformamide.

4. The process according to claim 3 in which said contacting is carried out at a temperature from about −50 to 100° F. and a pressure from 100 to 1000 p.s.i.g.

5. The process of removing gaseous acid gas selected from the group consisting of carbon dioxide and hydrogen sulfide from admixture with gaseous $C_1$—$C_3$ alkane hydrocarbons which comprises contacting said gaseous admixture in a first contacting zone with a mixture of an acid gas absorbent consisting essentially of a first solvent, selected from the group consisting of hydroacrylonitrile and a mixture of hydroacrylonitrile with a liquid inert to the solvent and gas admixture constituents, and a second higher boiling liquid solvent adapted to absorb moisture and said first solvent; separately withdrawing a liquid stream consisting essentially of said second solvent and a gaseous stream comprising vaporized first solvent and unabsorbed components of said gaseous admixture from said first contacting zone; passing said gaseous stream through a cooling zone whereby part of said gaseous stream is condensed; separately withdrawing condensate and uncondensed components of said gaseous stream from said first cooling zone; combining said condensate with said liquid stream from said first contacting zone, and separating absorbed water and second solvent from the combined solution; contacting the uncondensed components of said gaseous stream in a second contacting zone with said first solvent, under conditions resulting in partial vaporization of said first solvent and absorption of said acid gas in the unvaporized first solvent; separately withdrawing a liquid stream of spent first solvent and a gaseous stream from said second contacting zone; contacting the gaseous stream from said second contacting zone in a third contacting zone with said second solvent, under conditions resulting in absorption of vaporized first solvent and water; separately withdrawing from said third contacting zone the unabsorbed components of the gaseous stream from said second contacting zone and said second solvent containing absorbed first solvent and water; recycling said second solvent from said third contacting zone to said first contacting zone; and separating the absorbed acid gas from said spent first solvent.

6. The process according to claim 5 in which the uncondensed components of said gaseous stream are passed through said second contacting zone at superatmospheric pressure in countercurrent contact with said first solvent.

7. The process according to claim 6 in which the pressure of said spent first solvent is reduced in a desorbing zone to flash-off acid gas, and the acid gas separated from said spent first solvent in said desorbing zone is contacted with said second solvent containing absorbed first solvent and water in a fourth contacting zone whereby entrained vaporized first solvent is absorbed.

8. The process according to claim 7 in which said second solvent withdrawn from said first contacting zone is introduced into said fourth contacting zone after at least part of the absorbed water and first solvent are removed therefrom.

9. The process according to claim 8 in which a stream of said second solvent is removed from said fourth contacting zone and parts thereof are introduced into said first and third contacting zones.

10. The process according to claim 9 in which a stream of said first solvent separated from said second solvent withdrawn from said first contact zone is introduced into said desorbing zone and said second solvent is a glycol.

References Cited by the Examiner

UNITED STATES PATENTS

| | | | |
|---|---|---|---|
| 2,139,375 | 12/1938 | Millar et al. | 55—73 |
| 2,486,778 | 11/1949 | Doumani | 23—2 |
| 2,614,904 | 10/1952 | Royer | 23—150 X |
| 2,668,748 | 2/1954 | Asbury | 23—150 X |
| 2,781,863 | 2/1957 | Bloch et al. | 55—73 X |
| 2,863,527 | 12/1958 | Herbert et al. | |
| 2,926,751 | 3/1960 | Kohl et al. | 55—68 X |
| 3,097,917 | 7/1963 | Dotts et al. | 55—73 X |
| 3,137,654 | 6/1964 | Johnson et al. | 23—2 X |

FOREIGN PATENTS

| | | |
|---|---|---|
| 596,692 | 4/1960 | Canada. |
| 596,693 | 4/1960 | Canada. |
| 728,444 | 4/1955 | Great Britain. |
| 750,399 | 6/1956 | Great Britain. |

REUBEN FRIEDMAN, *Primary Examiner.*

D. TALBERT, *Assistant Examiner.*